June 24, 1924.
A. M. TAYLOR ET AL
1,498,701
AUTOMOBILE TOWLINE
Filed April 13, 1922
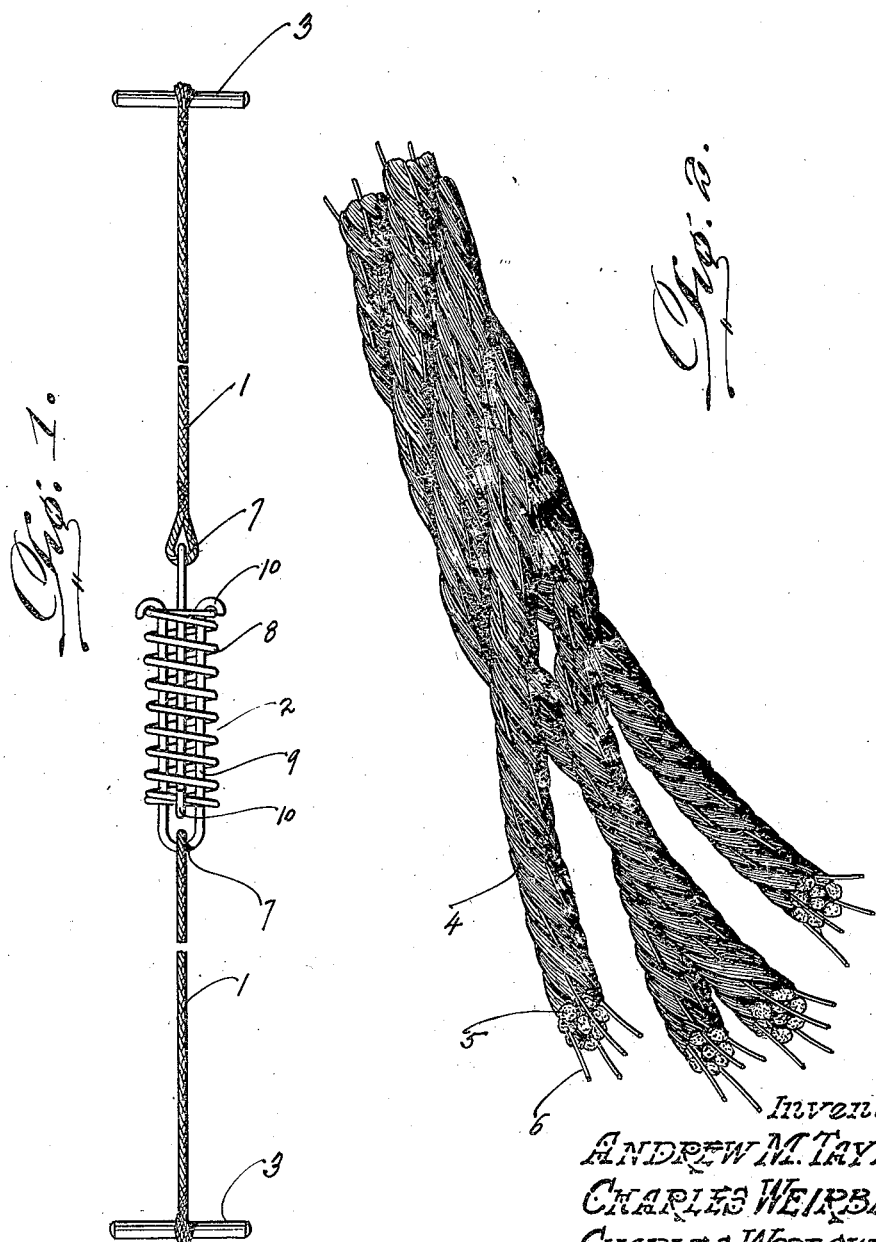
Witnesses:-
Inventors
ANDREW M. TAYLOR,
CHARLES WEIRBACH,
CHARLES WOODSWORTH.
BY
ATTORNEY.

Patented June 24, 1924.

1,498,701

UNITED STATES PATENT OFFICE.

ANDREW M. TAYLOR, CHARLES WEIRBACH, AND CHARLES WOODWORTH, OF KINGSTON, NEW YORK.

AUTOMOBILE TOWLINE.

Application filed April 13, 1922. Serial No. 552,435.

*To all whom it may concern:*

Be it known that that we, ANDREW M. TAYLOR, CHARLES WEIRBACH, and CHARLES WOODWORTH, citizens of the United States, residing at Kingston, in the county of Ulster and State of New York, have invented new and useful Improvements in Automobile Towlines, of which the following is a specification.

One object of our said joint invention is the provision of an automobile tow line possessed of shock absorbing capacity when subjected to pull.

Another object of the invention is the provision of a tow line embodying rope of hemp of analogous material and wires so relatively arranged that the wires are prevented from injuring the paint or varnish of an automobile and at the same time the line when small in diameter and compact is strong and durable as well as pliable and elastic.

Another object is the provision of a tow line equipped at its ends with wooden T-heads calculated to facilitate attachment of the ends to automobiles.

To the attainment of the foregoing, the invention consists in the improvement as hereinafter described and definitely claimed.

In the accompanying drawings, forming part of this specification:—

Figure 1 is a broken elevation showing our novel tow line in straight state.

Figure 2 is an enlarged fragmentary perspective illustrating the formation of the cable sections of the tow line.

Similar numerals of reference designate corresponding parts in both views of the drawings.

In the present and best practical embodiment of our invention of which we are cognizant, our novel tow line is made up of cable sections 1, a shock absorber 2 interposed between said sections 1, and wooden T-heads 3 at the outer ends of the cable section 1, all as shown in Figure 1.

We expressly claim patentable novelty in the peculiar constitution of the cable sections 1, and desire it distinctly understood that it is within the purview of our invention to form a tow line throughout of cable such as will now be described in detail. By particular reference to Figure 2 it will be understood that the cable of which the sections 1 are formed, is made up of a plurality of, say four, strands 4, twisted about each other, and each strand 4 is made up of a plurality of, say eight twisted sub-strands 5 of hemp or analogous material, and plurality of annealed wires 6 interwoven or interlaced with the sub-strands 5 in such manner that the sub-strands 5 or portions thereof pad the wires 6 so as to preclude scratching or marring of the paint or varnish of an automobile. It will also be noted in this connection that the sub-strands 5 and strands 4 of manila twine or hemp serve to cushion the wires 6 and render the cable pliable, elastic and strong notwithstanding it may be small in diameter and therefore compact.

Each of the cable sections 1 formed as described is provided at its inner end with a loop 7.

The wires 6 being fine annealed wires, the cable sections 1 are capable of being looped about the wooden T-heads 3, and when said T-heads are inserted through apertures in automobile portions they are adapted to bear crosswise against said portions with little liability of marring said portions.

The shock absorber 2 of the tow line is made up of a coiled expansion spring 8 and drawbars 9; the said draw-bars being of loop-form and being reversely arranged so that each extends through and is movable longitudinally in the convolutions of the spring. The bight of each loop-shaped draw-bar 9 is interlocked with the adjacent cable loop 7, and the ends of the draw-bars are shaped into hooks 10 so as to seat the end convolutions of the spring, as shown. From this it follows that when the line is subjected to pull, the spring 8 will be compressed and will serve in combination with the draw-bars 9 to form an efficient shock absorber, calculated to take strain off the cable sections 1.

At their outer ends the cable sections 1 are looped about or otherwise appropriately connected to the wooden T-heads 3. These T-heads 3 are adapted to render easy the attachment and detachment of the cables or cable sections 1, and this without liability of scratching or marring the paint or varnish of automobiles.

Manifestly when not in use our novel tow line is adapted to be coiled or folded or otherwise reduced to small compass so as to render it feasible to carry the same in an automobile tool box.

We have entered into a detailed description of the construction and relative arrangement of the parts embraced in the present and preferred embodiment of our invention in order to impart a full, clear and exact understanding of the said embodiment. We do not desire, however, to be understood as confining ourselves to the said specific construction and relative arrangement of parts inasmuch as in the future practice of the invention various changes and modifications may be made such as fall within the scope of our invention as defined in our appended claim.

Having described our invention, what we claim and desire to secure by Letters-Patent, is:—

A cable consisting of strands of fibrous material spirally twisted together and strands of wire composed of soft metal disposed longitudinally of the cable and transversely of the convolutions of the twist of the fibrous strands, the said wire strands being threaded in an alternate manner over and under the adjacent fibrous strands which are disposed at the exterior of the body of the cable.

In testimony whereof, we affix our signatures.

ANDREW M. TAYLOR.
CHARLES WEIRBACH.
CHARLES WOODWORTH.